July 2, 1963  C. N. LENGYEL  3,095,753
CONVEYOR CHAIN LINK
Filed Feb. 1, 1960  2 Sheets-Sheet 1
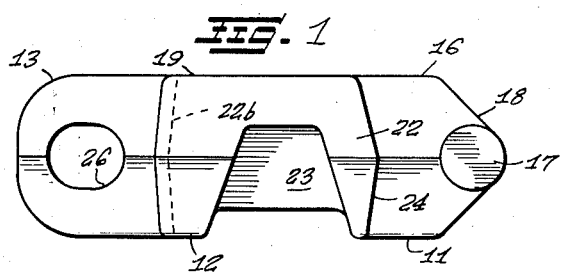
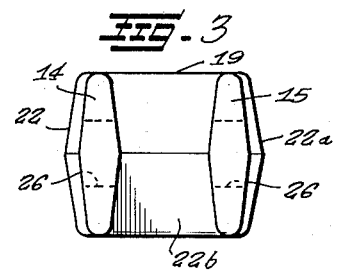
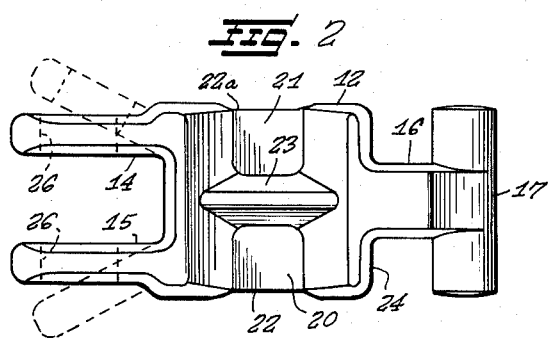
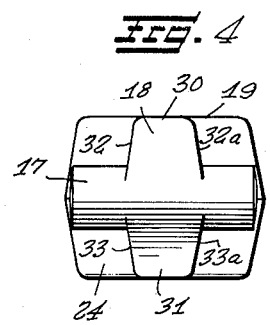
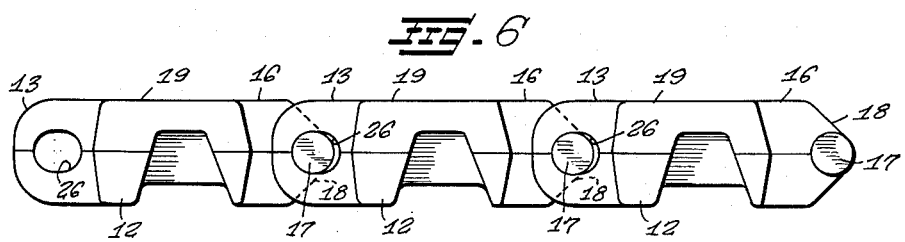
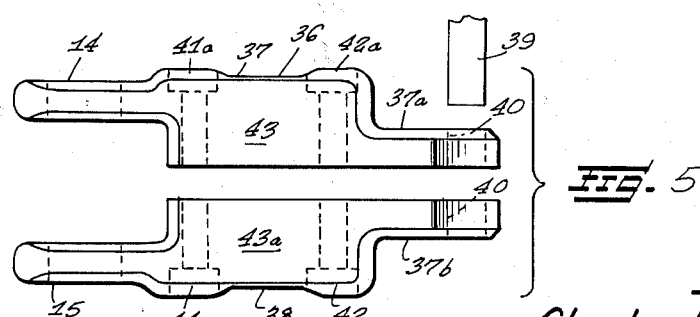
Inventor
Charles N. Lengyel July 2, 1963 C. N. LENGYEL 3,095,753
CONVEYOR CHAIN LINK
Filed Feb. 1, 1960 2 Sheets-Sheet 2
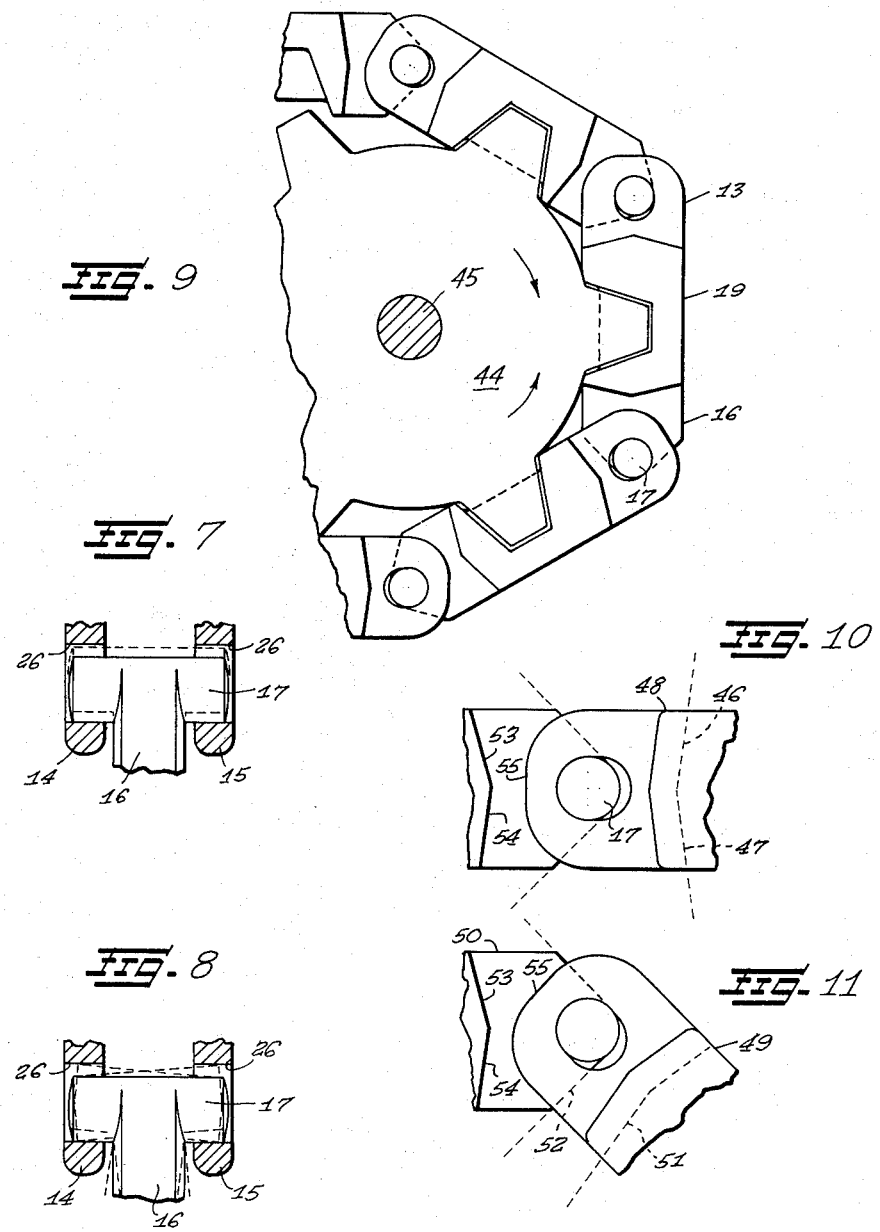
Inventor
Charles N. Lengyel

United States Patent Office 3,095,753
Patented July 2, 1963

3,095,753
CONVEYOR CHAIN LINK
Charles N. Lengyel, Chicago, Ill., assignor to Kropp Forge Company, Chicago, Ill., a corporation of Illinois
Filed Feb. 1, 1960, Ser. No. 5,730
3 Claims. (Cl. 74—248)

The present invention relates to a conveyor chain link.

It has been customary in the prior art to construct integral conveyor chain links comprised of a body portion, a clevis portion and a tongue portion. To form chain lengths it was necessary to utilize a separate pin to connect the tongue of one link between the clevis of an adjacent link. In this prior art arrangement, therefore, three holes were drilled in each link and the clevis extensions intended for receiving the pin head in order to permit passage of the link around the driving means sprockets. Manufacture of this arrangement involved a variety of expensive machining and assembly operations, the use of separate pins and the like. The conveyor links were forged to rough size, trimmed and machined. Furthermore, it was necessary to broach the hole formed in the tongue into an oval shape to provide for clearance around the sprockets of the driving means. The pairs of separate pins employed to join adjacent links were subject to fatigue failure and wear while in use which frequently caused the pins to fracture, break and drop out thereby interrupting the production line operation.

By employment of my invention wherein the pin is formed integrally with the tongue, I eliminate the requirement for the pairs of separate pins, simplify the link manufacturing process, eliminate the necessity for drilling and broaching a hole in the tongue and further provide links which are easily assembled into desired chain links.

It is therefore an object of the present invention to provide new and improved driven means.

It is another object of the present invention to eliminate the requirement for separate pins to connect adjacent links in chain lengths.

It is still a further object of the present invention to provide a link construction facilitating clearance around chain length driving means sprockets.

It is a further object of the present invention to provide links of greater strength than links heretofore employed.

It is another object of this invention to provide link chain lengths subject to minimum stress forces in many planes of operation.

Another object of the present invention is to provide links requiring a minimum of machining and drilling.

Still another object of the present invention is to provide link members easily assembled in chain lengths.

A further object of the present invention is to provide chain links having a minimum of components.

Another object of this invention is the provision of link chain length members, simple and compact in construction and efficient in operation.

These and other objects and features of the present invention will become apparent upon a careful consideration of the following detailed description, when taken in conjunction with the accompanying drawings illustrating preferred embodiments of the concepts of my invention, wherein like reference characters refer to like or corresponding parts throughout the several views.

FIGURE 1 is a side elevational view of a link constructed in accordance with the principles of this invention;

FIGURE 2 is a bottom elevational view of the link of FIGURE 1;

FIGURE 3 is a view in elevation illustrating the finger extensions of the clevis portion of the link of FIGURE 1;

FIGURE 4 is a front elevational view illustrating details of the integral pin feature of the link of FIGURE 1;

FIGURE 5 is a view in elevation showing a connecting link constructed in accordance with our invention;

FIGURE 6 is a view in side elevation showing a plurality of link members assembled in articulate relation;

FIGURE 7 is a fragmentary view in partial elevation illustrating the degree of transitional movement permitting the integral pin of a link member when positioned in the coaxially aligned bores of the clevis of an adjacent link;

FIGURE 8 is a fragmentary view in partial elevation showing the degree of lateral movement permitted the integral pin of a link member when positioned in the complementary bores of an adjacent link;

FIGURE 9 is a side elevational view of a chain link constructed in accordance with my invention traversing the driving means sprockets;

FIGURE 10 is a fragmental view in elevation illustrating the clearance distance between the tongue of a link and body of an adjacent link; and FIGURE 11 is a fragmentary sectional view illustrating the cooperative relation between adjacent links in traversing driving means sprockets.

As shown on the drawing:

Referring to FIGURE 1, a link 11, constructed in accordance with the principles of my invention, comprises three major integral portions, a body portion 12, a clevis portion 13 having a pair of bored finger extensions 14 and 15 and a tongue portion 16 provided with an integral pin 17 formed in close proximity to the arcuate surface 18 of the tongue portion 16.

The body portion 12 is provided with a flat upper surface 19, and, in the preferred arrangement shown in FIGURE 2, is provided with a pair of recesses 20 and 21 adapted to receive the teeth of the driving means employed therewith. The respective side walls 22 and 22a of the body portion 12 are open to facilitate adjustment of the links in assembled relation with the driving means sprocket teeth and to lighten the weight of the link. A generally centrally located divider wall 23 formed integrally with the body portion assures positive seating of the link on the driving means sprocket teeth and assists in preventing undesirable movement of the link during operation.

The inclined end wall 24 of the link body portion 12 from which the tongue portion 16 extends is convergingly tapered inwardly on each side of the tongue to the longitudinal axis of the link member 11, as clearly appears in FIGURE 1. The angular inclination of the taper of the upper portion of the end wall 24 is preferably of greater magnitude than the corresponding taper of the lower portion of the end wall to prevent binding thereof with the end surfaces of the adjacent link member when in use as hereinafter described.

The clevis portion 13 is formed integral with the body portion and finger extensions 14 and 15 thereof are each provided with a slot 26 adapted to receive the pin of the adjacent link and to permit lateral translation and limited relative displacement of the pin of the adjacent link, when assembled.

As shown in FIGURE 3 finger extensions 14 and 15 of clevis 13 are positioned inwardly of body portion side walls 22 and 22a and define therebetween a side wall portion 22b. The opposed major outer and inner surfaces of each of the finger extensions 14 and 15 are inwardly tapered from the longitudinal axis of the link member to the upper and lower minor surfaces of the respective finger. By thus inclining the inner surfaces of the finger extensions, provision is thereby made for preventing contact with the adjacent link tongue when assembled therewith. Similarly, the inclination of the recessed side wall 22b, shown in dotted lines in FIGURE 1, permits mutual cooperation of the side wall with the arcuate end of the tongue portion of the adjacent link to prevent contact therebetween. Thus contact between adjacent links is limited to the tongue and clevis bores.

Centrally located in the side wall 24 of the body portion is the integral tongue portion 16. The minor surfaces 30 and 31 of the tongue longitudinally extend for a distance in parallel relation and converge to form the arcuate end surface 18.

As appears in FIGURE 4, the major wall surface sections 32, 32a, 33 and 33a of the tongue incline inwardly to the minor surfaces 30 and 31. That is to say, the major opposed walls of the tongue are substantially convex in section. The generally cylindrically shaped pin 17 is integrally mounted in close proximity to the arcurate surface 18 of the tongue and extends laterally across the horizontal axis of the tongue.

As appears in FIGURE 5, a connector link 36 is constructed in two sections 37 and 38. Each section provides a longitudinal half of a link. The respective tongue portions 37a and 37b are bored to receive securing means 39 which is inserted through the clevis slots of an adjacent link and the tongue bore 40. Sections 37 and 38 are also secured together in any suitable manner as by means of screws, roll pins or the like seated in bores 41 and 42 formed in the body portion 43 and 43a of the connector link. A pair of counter bores 41a and 42a may be formed in the body portion to recess the pin heads to permit clearance in movement around the driving means sprockets.

A plurality of links in assembled relation are shown in FIGURE 6.

The discussion now to follow will describe a preferred process for producing links in accordance with my invention and the manner of assembling links in articulate relation. A link stock blank, preferably of 4140 steel, is hot forged to rough link form in any well known manner. The rough formed link is heated to approximately 1800° F. and the finger extensions thereof inclined outwardly to slope about 30° from the longitudinal axis of the stock, as appears in dotted lines in FIGURE 2. The forged stock is then slowly air cooled to preserve the desired ductility of the finger extensions. The forged stock is next machined and the oval holes or slots 26 and 26 formed in the finger extensions of the clevis. The integral pin 17 formed on the tongue portion is milled and the thus formed link is now ready for assembly in chain lengths. The links are easily assembled into chain lengths while in this soft ductile condition by employment of conventional pressure cylinders which press the outwardly sloped clevis fingers inwardly over the integral pin of the adjacent link. After assembly, the chain length is subjected to a heat treatment cycle at a temperature of approximately 1500° F. and, thereafter the length is water-quenched to obtain the desired hardness. The links formed in the manner above described exhibited a Rockwell "C" hardness lying within the range of 40 to 45.

The connector link 36, which may be utilized additionally for repair purposes, is forged in two sections under the same conditions above described. The fasteners utilized with the connector link may be any suitable, conventional fastener such as screws, roll pins, etc.

As aforesaid, the oval-shaped slots 26 and 26 formed in the finger extensions 14 and 15 of the clevis provide means for permitting translation of the pin 17 therein. In operation, the links of the chain length are constantly undergoing relative displacement in many planes of operation producing corresponding stress forces which act on the respective links and cause fatigue failure. To eliminate the application of such forces in as many planes as possible and to minimize stress producing contact between adjacent links, the oval-shaped slots in the clevis finger extensions of links are formed to permit lateral translation of the pin of an adjacent link as shown by the dotted lines in FIGURE 7. Additionally, the slots in the finger extensions permit limited translation of the tongue of the adjacent link about the horizontal axis as shown in dotted lines in FIGURE 8. Thus the stresses acting on the integral pin formed in the tongue of the adjacent link caused by relative displacement of two connected links are minimized and the attendant fatigue effects produced thereby substantially eliminated.

FIGURE 9 illustrates a plurality of links connected in an endless chain link traversing the sprocket wheel 44 of the chain driving means. Sprocket 44 is operatively responsive to driving shaft 45 connected to driving means of conventional construction (not shown).

The relative displacement of the links and the cumulative stress effects produced thereby on each of the individual links in the chain particularly when traversing the sprocket wheel, provides a source of the major causes of chain breakdown and fatigue failure in the individual links.

As appears in FIGURE 10, the inclinations of the arcuate end surface of the tongue of a link and the position of the integrally formed pin 17 in close proximity to the end of the tongue cooperate with the complementarily formed inclined surfaces 46 and 47 of the side wall of the adjacent link 48 to prevent contact therebetween and thereby prevent stress translations from one link to the other which would otherwise be caused by such contact regardless of the relative position of the adjacent links during traversal of the driving means sprocket.

For example, as appears in FIGURE 11, wherein link 49 is shown in one of the most extreme positions of relative displacement with respect to the adjacent link 50, a sufficient clearance space still exists between the inclined side wall 51 shown in dotted lines of body portion 49 and the complementary inclined tongue surface 52 shown in dotted lines of the adjacent link 50 thereby preventing contact between the links which would produce stress force translation between adjacent links which would be caused by such contact. In addition the tapered side wall portions 53 and 54 prevent contact between the body portion of link 50 and the end wall 55 of the adjacent link 49. Furthermore, because of the structural features of my invention, the link endless chain may be driven in either direction as shown by the arrows and the same desirable mode of operation achieved.

It will be appreciated from the foregoing that by employment of link and link assemblages having the features of my invention, I eliminate the requirement for apertures in the tongue portion of the link, the requirement for separate pins to join adjacent links in a chain length, the necessity for indenting clevis finger extensions to permit clearance of the separate pin heads around the sprocket teeth of the driving means, eliminate the possibility of production line shutdown caused by fatigue failure of the separate pins and substantially eliminate the deleterious effects of stress forces produced by and between adjacent links caused by relative displacement thereof.

Although various minor modifications might be suggested by those versed in the art, it should be understood that I wish to embody within the scope of the patent warranted hereon all such embodiments as reasonably and properly come within the scope of my contribution to the art.

I claim as my invention:
1. A conveyor chain link member which comprises, an integral one-piece metal forging having a central body portion with end walls,
a top wall,
side walls and a recessed bottom wall adapted to receive a sprocket tooth,
a tongue portion projecting longitudinally away from one end wall of said body portion centrally thereof,
a transverse pin portion formed integrally with the end of said tongue portion and projecting equal amounts beyond opposite sides of said tongue portion, and a clevis portion projecting from the opposite end wall of said body portion from said tongue portion and including a pair of fingers initially extending angularly outwardly of said end wall and body portion and each having an aperture extending transversely therethrough, said fingers being adapted to receive the tongue portion of an identical chain link member therebetween and being sufficiently ductile to accommodate bending from initial positions diverging laterally from said body portion to register with the pin portion of an identical link member into positions substantially parallel with the longitudinal axis of the identical link member and being quench hardenable after assembly to remain in fixed parallel relation with respect to each other and thereby retain the pin portion of a next adjacent link member in articulated relationship therewith, and said pin portion having a total length greater than the distance between said fingers when in fixed parallel relation with respect to each other.

2. A conveyor chain link member according to claim 1, in which said side walls are each substantially convex in cross-section, said recessed bottom wall having a pair of recesses separated by a common wall and adapted to receive a pair of complementary shaped extensions of link driving means; said tongue portion having an arcuate end and the major surfaces of said tongue portion being substantially convex in section; and said apertures of said fingers being elongated longitudinally of said fingers and said pin being of circled cross-section to permit translation of said pin in the apertures of the fingers of a substantially identical link in a plurality of planes.

3. A conveyor chain link member according to claim 1, in which said recessed bottom wall has a pair of recesses formed therein for receiving a pair of complementary extensions of link driving means; said pair fingers formed integrally with a substantially convex side wall of said body portion, the opposed major surfaces of said extensions in section tapering in converging relation from the outer end thereof to a center point; said tongue portion having an arcuate end surface extending from a substantially convex side wall of said body portion in integral relation therewith and said transverse pin formed near the outer arcuate end of said tongue portion, and the major surfaces of said tongue portion being substantially convex in section.

References Cited in the file of this patent

UNITED STATES PATENTS

| | | |
|---|---|---|
| 150,325 | Jaggi | Apr. 28, 1874 |
| 180,907 | Morgan | Aug. 8, 1876 |
| 190,147 | Kingwell | May 1, 1877 |
| 436,608 | Miller | Sept. 16, 1890 |
| 576,591 | Leaycraft | Feb. 9, 1897 |
| 1,804,701 | Mojonnier | May 12, 1931 |
| 1,866,993 | Benner | July 12, 1932 |
| 2,000,499 | Roland | May 7, 1935 |
| 2,118,348 | Hoeffleur | May 24, 1938 |
| 2,155,626 | Weiss | Apr. 25, 1939 |
| 2,213,448 | Morton | Sept. 3, 1940 |
| 2,256,005 | Wood | Sept. 16, 1941 |
| 2,319,979 | Collins et al. | May 25, 1943 |
| 2,460,524 | Morin | Feb. 1, 1949 |
| 2,665,547 | Soderlund | Jan. 12, 1954 |